Dec. 15, 1953

C. L. NELSON 2,662,546

VALVE FOR HOSE LINES

Filed Nov. 16, 1949

Inventor

CLARENCE E. NELSON

By Chas. C. Reif

ATTORNEY.

Patented Dec. 15, 1953

2,662,546

UNITED STATES PATENT OFFICE 2,662,546

VALVE FOR HOSE LINES

Clarence L. Nelson, Minneapolis, Minn.

Application November 16, 1949, Serial No. 127,640

1 Claim. (Cl. 137—382)

This invention relates to a valve adapted to be disposed in a hose line. While the invention may have many applications, it is particularly designed to be used with the common hose used for sprinkling lawns. It is a common practice to use lawn sprinklers which are secured to one end of the hose, and these are often located quite a distance from the faucet or supplying pipe to which the other end of the hose is connected. Said sprinklers usually distribute water over quite an area or for a considerable distance. When it is desired to change the position of the sprinkler, it is necessary for the operator to first shut off the supply of water at the faucet and then to walk to the other end of the hose to move the sprinkler to the new location. The operator must then walk back to the faucet or supply regulating valve and again turn on the water.

It is an object of this invention to provide a simple and easily operated valve which can be disposed in the hose line rather close to the sprinkler. When it is desired to move the sprinkler, this valve can be closed and the sprinkler then moved and said valve again opened without the operator having to go back to the supply faucet or valve.

It is a further object of the invention to provide a valve having a substantially spherical body and comprising a cock having an operating handle, said body having a recess in which said handle is disposed whereby said valve can be dragged along on the ground without altering the position of said handle and cock.

It is another object of the invention to provide such a valve as set forth in the preceding paragraph, the same having spaced portions thereon for the convenient attachment of hoses.

These and other objects and advantages of the invention will be fully set forth in the following description made in connection with the accompanying drawings in which like reference characters refer to similar parts throughout the several views and in which.

Figure 1:
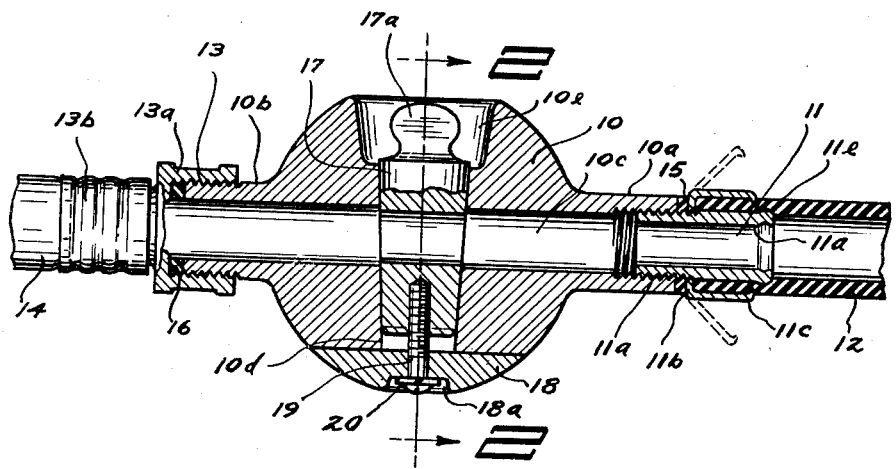
Fig. 1 is a central longitudinal vertical section through the valve.
Figure 2:
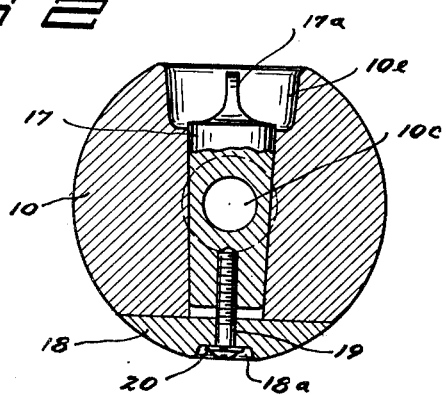
Fig. 2 is a vertical section taken substantially on line 2—2 of Fig. 1, as indicated by the arrows.

Referring to the drawings, a valve is shown having a valve body 10 which is of general spherical shape, the same having hub portions 10a and 10b at different sides thereof, which, in the embodiment of the invention illustrated, are shown at opposite sides of said body. A passage 10c extends centrally through the valve body 10 and through the hubs 10a and 10b. Hub 10a is interiorly threaded to receive one end of a hose coupling 11 which has a threaded end 11a adapted to be screwed into hub 10a. Coupling 11 carries a disk 11b from which extend radial circumferentially spaced prongs 11c. Coupling 11 has an end portion 11d having an annular enlargement 11e at its outer end. A hose 12, such as the ordinary garden hose, extends over the portion 11d and is held in position by the prongs 11c which are bent to have their pointed ends engage and seat in the hose 12, as shown in Fig. 1. The coupling 11 is similar to standard hose couplings. The other hub 10b is exteriorly threaded to have screwed thereon a portion 13a of a hose coupling 13. Coupling 13 has a portion 13b over which the hose 14 extends. Gaskets 15 and 16 can be disposed between the couplings 11 and 13 and the respective ends of the hubs 10a and 10b.

Valve body 10 has another passage 10d extending centrally therethrough and substantially at right angles to passage 10c. Passage 10d is tapered somewhat and adapted to receive a tapered frusto-conical cock 17. Cock 17 has a handle portion 17a at one end and this is disposed in a recess 10e at one side of valve body 10. The outer end of handle 17a is below the top of recess 10e. Valve body 10 is flattened at one side and a segmental portion 18 is secured to said side substantially completing the sphere formed by said body. Portion 18 is held in position by a screw 19 which extends therethrough and is threaded into cock 17. A washer 20 underlies the rounded head of screw 19. Said washer 20 and said head are disposed in a recess 18a in portion 18.

With the described structure the valve can be disposed in the hose line at a distance just outside of the range of sprinkling of the sprinkler at one end of said line. When it is desired to change the location of the sprinkler, cock 17 can be turned 90 degrees to shut off the supply of water to the sprinkler. After the sprinkler has been re-located, cock 17 can again be turned to open passage 10c and again supply water to the sprinkler. It is thus unnecessary for the operator to make a trip to the supply faucet or valve at the other end of the hose. It may be necessary or desirable to drag the valve body 10 along the ground or lawn. By having the handle 17a disposed in the recess 10e, the handle 17a will not come in contact with the ground and its position will thus not be altered. Recess 18a will also prevent washer 20 and the head of screw 19 from any substantial engagement with the ground. The valve is constructed for easy and quick attachment of the hoses at each side thereof.

From the above description it will be seen that I have provided a simple and efficient form of valve which will have a high degree of utility when used in a hose line, particularly in a hose line connected to a lawn sprinkler. The valve can be inexpensively made and can be easily and quickly connected in the hose line. The device will have a high degree of utility for the purpose intended.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A valve adapted for use in a lawn-sprinkling hose line, having in combination, a substantially smooth spherical body having substantially cylindrical portions projecting at opposite sides thereof, said body having a flat side between said portions, a substantially cylindrical recess at the side opposite said flat side and a diametrical bore coaxial with said recess, extending from said recess to and tapering to said flat side, said portions having their end portions respectively interiorly and exteriorly threaded to receive respectively male and female couplings for lawn-sprinkling hoses, a one-piece cock fitting in said bore, having one end spaced from said flat side and having a flat handle portion at its other end disposed entirely in said recess, a plate-like member engaging said flat side and so formed as to substantially complete the spherical shape of the body, a headed screw extending centrally through said member and threaded axially into said cock, said member being recessed to receive the head of said screw, said body having a passage extending longitudinally therethrough and through said first mentioned portion and said cock having a transverse passage therethrough adapted to be moved into and out of alignment with said first mentioned passage.

CLARENCE L. NELSON.

References Cited in the file of this patent

UNITED STATES PATENTS

| Number | Name | Date |
|---|---|---|
| 1,289,415 | Dutton | Dec. 31, 1918 |
| 1,502,106 | Lyne | July 22, 1924 |
| 2,418,404 | Greenlee | Apr. 1, 1947 |